United States Patent [19]

Hall

[11] 4,200,910
[45] Apr. 29, 1980

[54] PROGRAMMABLE TIME VARYING CONTROL SYSTEM AND METHOD

[76] Inventor: Burness C. Hall, P.O. Box 1283, Dickinson, Tex. 77539

[21] Appl. No.: 873,093

[22] Filed: Jan. 30, 1978

Related U.S. Application Data

[63] Continuation-in-part of Ser. No. 774,393, Mar. 4, 1977, Pat. No. 4,071,745.

[51] Int. Cl.² ........................................... G05D 23/32
[52] U.S. Cl. ................................... 364/104; 364/120; 165/22; 165/11; 236/46 R
[58] Field of Search ............... 364/104, 120, 119, 557, 364/418, 505; 236/46 R, 68 B; 165/22, 26, 11

[56] References Cited

U.S. PATENT DOCUMENTS

| | | | |
|---|---|---|---|
| 2,871,869 | 2/1959 | Howard | 236/46 X |
| 3,882,928 | 5/1975 | Gazzo | 165/22 X |
| 3,942,718 | 3/1976 | Esposito et al. | 165/26 X |
| 4,071,745 | 1/1978 | Hall | 364/104 |

*Primary Examiner*—Edward J. Wise

[57] ABSTRACT

An electronic system and method are disclosed for controlling a measured temperature during a sequence of time intervals, in accordance with a sequence of selected reference temperatures, each corresponding to one of the intervals. The values of the reference temperatures are programmable and changeable by the user. The system and method can be used to establish thermostatic control in conformity with a referenced temperature that varies throughout the day, for example, hour by hour. The system also provides for using different sequences of reference temperatures on different days.

37 Claims, 16 Drawing Figures

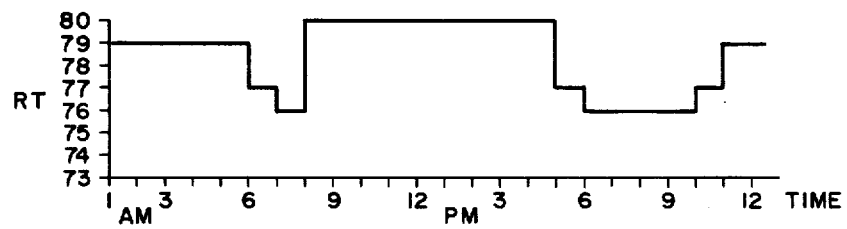
FIGURE 2A COOLING (OCCUPANTS NOT HOME DURING DAY)
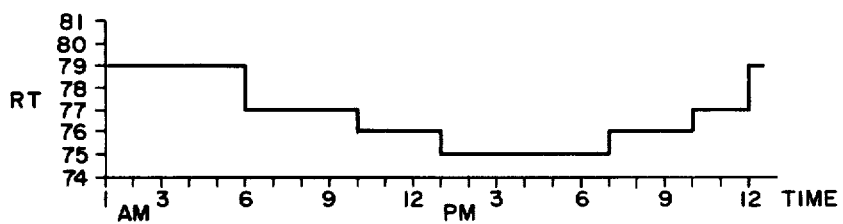
FIGURE 2B COOLING (OCCUPANTS HOME DURING DAY)
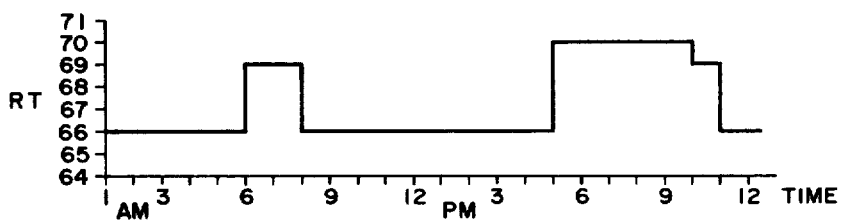
FIGURE 2C HEATING (OCCUPANTS NOT HOME DURING DAY)
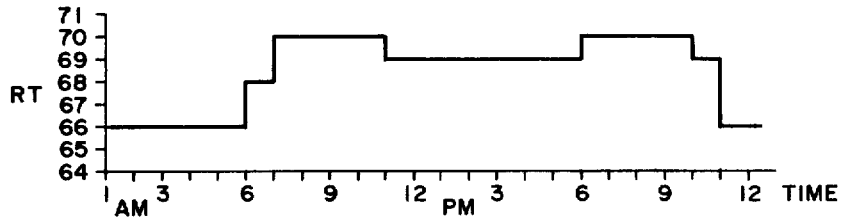
FIGURE 2D HEATING (OCCUPANTS HOME DURING DAY)

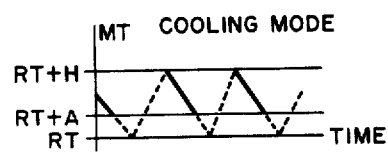
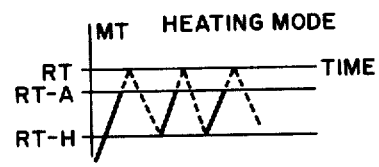
FIGURE 3A
FIGURE 3B
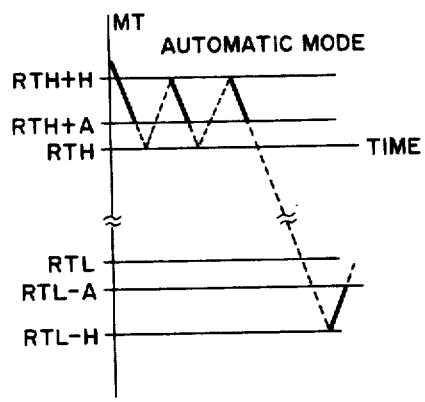
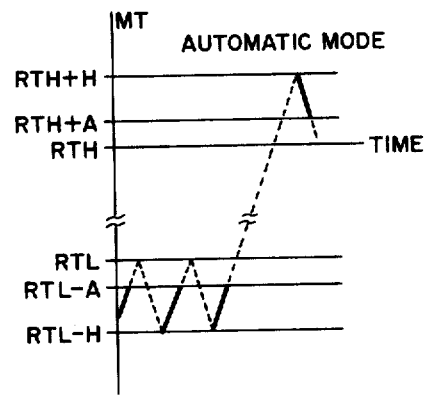
FIGURE 3C
FIGURE 3D
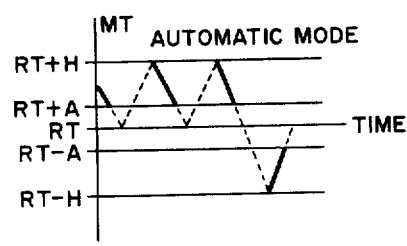
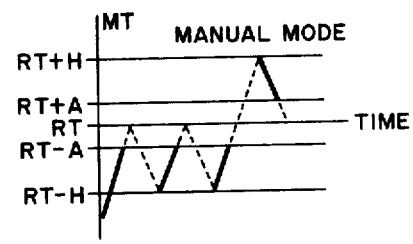
FIGURE 3E
FIGURE 3F 4,200,910

PROGRAMMABLE TIME VARYING CONTROL SYSTEM AND METHOD

BACKGROUND OF INVENTION

This application is a continuation-in-part of application Ser. No. 774,393, filed Mar. 4, 1977, now U.S. Pat. No. 4,071,745 issued Jan. 31, 1979.

This invention relates to a system and method for programmable time varying control and, more particularly, to a thermostatic system and method in which the reference temperature can be made to vary hour by hour in a programmed way.

In a control system operating against a significant load, considerable energy can be required to hold the controlled variable at or near a reference value. This happens in a thermostatic system when the uncontrolled value of temperature differs substantially from the desired (reference) temperature. It is a very effective means of reducing energy consumption under such circumstances to identify periods when less control is required and to provide for reducing control during those periods. For example, in the thermostatic control of cooling a home, it is effective to raise the thermostat reference temperatures during the early hours of the day before the external temperature reaches its maximum, during sleep periods and for periods when the occupants are going to be away. This can, of course, be done manually. However, in a manual system, it can be overlooked or forgotten and cannot be done as timely or accurately as with an automatic system. Another drawback of a manual system is its inconvenience, for example, if the reference temperature is raised when the occupants leave for some time, when they return, the temperature in the home has equilibrated at an uncomfortably high value and may take considerable time to reach a comfortable range. The present invention provides a system and method wherein the reference temperature is made to vary during the day, assuming a sequence of programmable values. This allows heating or cooling to be automatically initiated so as to reach a new reference temperature by a particular time, for example, when occupants of a home are to return.

SUMMARY OF THE INVENTION

In accordance with the present invention, there is provided a system for controlling a measured temperature during a sequence of time intervals, in conformity with a sequence of selected reference temperatures, each corresponding to one of the intervals. The system has means for storing digital numbers, each of which represents a value of one of the reference temperatures. It also has means for storing a digital number representative of a value of hysteresis. Further there are means, which can be connected to a reference frequency source, to repeatedly generate a digital number that is representative, at each generation, of the present time of day. An updating means repeatedly determines, from the time of day number, when one of the time intervals embraces the present time, and identifies the reference temperature corresponding to the embracing interval. The updating means stores, as a current reference temperature value, a digital number representing the value of the identified reference temperature. The updating means includes means for determining that as soon as the present time exceeds the last time intervals in the sequence, the present time is treated as being in the first interval in the sequence. The system has means which can be connected to a sensor of the measured temperature for generating an electrical signal representation of the measured temperature. A comparison means, responsive to the signal representation, to the current reference temperature number and to the hysteresis number, repeatedly generates control signals suitable for heating and/or cooling systems affecting the measured temperature. The hysteresis value establishes how far the measured temperature may deviate from the reference temperature, before heating or cooling is initiated.

In a preferred embodiment of the invention, there is provided means for storing a digital number representative of an anticipator value. In the embodiment, the comparison means includes apparatus for generating control signals capable of activating the heating and cooling system, when the measured temperature deviates from the current reference temperature by more than the hysteresis value. The comparison means also includes apparatus for generating control signals capable of deactivating the heating and/or cooling system, when the measured temperature is short of the current reference temperature value by the amount of the anticipator value. After the heating and/or cooling system is deactivated, residual heat or cold in the elements thereof, cause the measured temperature to reach the reference temperature value.

Also, in a preferred embodiment, means are provided allowing the user to enter the reference temperature numbers, so that he may select and change the reference temperature profile according to his own requirements. Additionally, a preferred embodiment includes means for the user to enter a digital number representing a reference temperature adjustment, wherein the comparison means includes apparatus for performing the generating of control signals, with the current reference temperature value modified by the value of the adjustment number. This allows changing the temperature of the controlled environment for an indefinite period, without affecting the stored reference temperature profile.

Additionally, a preferred embodiment of the system includes means for simultaneously utilizing a higher, cooling reference temperature and a lower, heating reference temperature. The system can then generate signals capable of activating a cooling system, when the measured temperature is above the higher reference temperature and activating a heating system, when the measured temperature is below the lower reference temperature.

An alternate embodiment of the invention is capable of multi-stage operation. That is, the comparison means generates control signals capable of commanding the heating and/or cooling system to heat or cool at more than one rate. The rate commanded is dependent on the amount of the deviation of the measured temperature from the current reference temperature value. This allows the heating and/or cooling system to affect the measured temperature faster, when the deviation from the reference temperature value is large.

Yet another embodiment of the invention is a system for controlling a measured temperature in each of a plurality of zones, during a sequence of time intervals.

The temperature is controlled in accordance with a sequence, for each zone, of reference temperature values, each corresponding to one of the time intervals. Included are means for generating, for each zone, control signals for apparatus affecting the temperature of air delivered to the zone.

In an improved embodiment of the invention, the user can select one sequence of reference temperatures to be used on days when he is at work and a different sequence to be used, when he is home from work.

The present invention also provides a method for the control of a measured temperature during a sequence of time intervals, in accordance with a sequence of selected reference temperatures, each corresponding to one of the intervals. The method includes storing, in electronically readable form, a plurality of digital numbers, each representing a value of one of the reference temperatures. Also stored in electronically readable form is a digital number representative of a value of hysteresis. The method further includes repeatedly generating, in electronic form, a digital number representing the present time of day at each generation. By an electronic comparison including the time of day number, it is repeatedly determined when one of said intervals embraces the present time. This determination includes deciding that as soon as the present time exceeds the last interval in the sequence of intervals, said time becomes embraced by the first interval in the sequence. An identification is made of the reference temperature corresponding to the embracing interval. A digital number representing the value of the identified reference temperature is stored, in electronically readable form, as a current reference temperature value. An electrical signal representation of the measured temperature is generated; then there is electronically generated a digital number representing a function of the current reference temperature and the hysteresis number. The function number and the representation of measured temperature are electronically compared and, based on the results signals are generated suitable to control means affecting the measured temperature.

BRIEF DESCRIPTION OF THE DRAWING

FIG. 2 is a set of graphs showing possible profiles of reference temperatures over a twenty-four hour day.

FIG. 3 is a collection of graphs showing, in schematic fashion, the time variation of measured temperature under control of a system in accordance with the invention.

DESCRIPTION OF THE PREFERRED EMBODIMENT

The present invention can be implemented with various electronic systems. One approach is the use of logic circuit chips or modules interconnected to perform the functions required. The approach to be described herein employs a programmed microprocessor. The description that follows sets forth functions that must be performed by units of the microprocessor, in the operation of the system according to the invention. For a particular function to be performed, the microprocessor must be programmed to step through a sequence of instructions that command the described function. In some cases, the statement of function is practically equivalent to specifying a sequence of instructions. For example, if two numbers are to be compared, this is accomplished on some computers by the conventional mode sequence of (1) loading a register with the contents of a memory location containing one of the numbers, and (2) comparing the number in the register with the contents of a memory location containing the other number. In other cases, more instructions will be required, but it will be understood how to design a program providing the described functions, in the context of conventional microprocessor practice.

Figure 1:
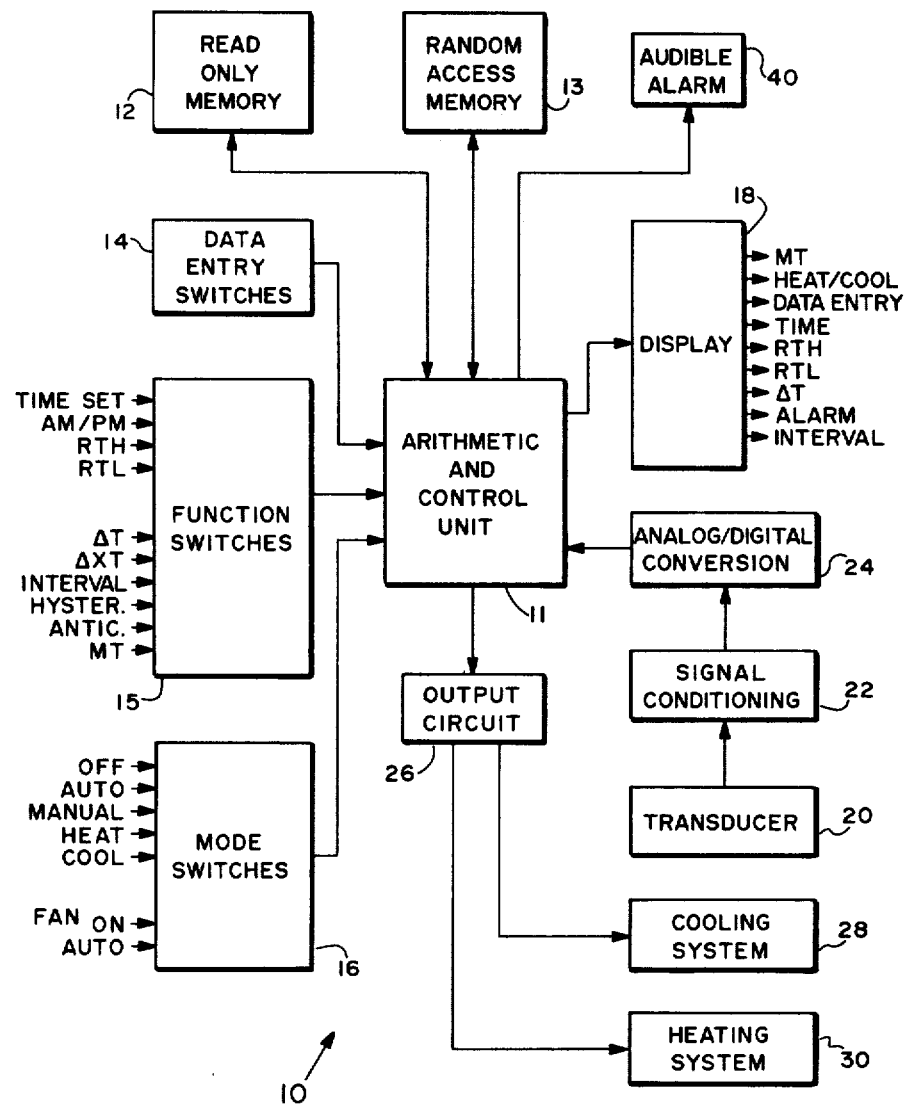
FIG. 1 is a block diagram of a thermostatic control system according to the invention.

FIG. 1 shows a thermostatic system according to the invention, indicated generally by the reference numeral 10. The microprocessor in system 10 includes an arithmetic and control unit 11, a random access memory 13, and a read-only memory 12 for the storage of constants and the operating program. Data entry switches 14 allow the selection of digits of a number to be entered into the microprocessor. Function switches 15 are used to designate the nature of the data being entered on the data entry switches 14. Mode switches 16 permit selection of an operating mode for system 10. A display unit 18 provides alphanumeric and on-off displays for a number of the variables and parameters of system 10. Unit 18 can be of the light emitting diode type, a liquid crystal display or a gas-discharge type electronic display.

A transducer 20 produces an electrical signal proportional to the present temperature in a region where the temperature is to be controlled. A signal conditioning circuit 22 contains an amplifier having suitable response for enhancing the quality of the transducer signal passed to the microprocessor. The gain of circuit 22 provides scaling appropriate to the next circuit, an analog-to-digital converter 24, which provides to unit 11 a digital representation of the temperature sensed by transducer 20. An output circuit 26 is responsive to logic states in unit 11 to produce signals capable of providing single or multiple stage control for a cooling system 28 and a heating system 30 which affect the region where transducer 20 is located. Output circuit 26 can have, for example, analog, digital or discrete (on/off) type outputs utilizing amplifiers, linedrivers, triacs or relays that interface with cooling system 28 or heating system 30.

TYPICAL USE

Thermostatic system 10 accepts a sequence of reference temperature values, each corresponding to one of a sequence of time intervals. Preferably, there are 24 possible time intervals so that reference temperatures may be entered for each hour of the day. Then, during that hour of the day, temperature is controlled by system 10 in accordance with the reference temperature for that hour.

FIG. 2 shows several possible sequences of reference temperatures, RT for cooling and heating. The FIGURES show how the reference temperature, RT settings vary with the time of the day. In the FIGURES, one time interval has been assumed to be equal to one hour. The measured temperature response to these reference temperature values is a function of the heating/cooling capacities of the systems, thermal time constants, heat loads, external temperature/weather conditions, etc.

FIG. 2A depicts a cooling case where the user is not home during the day. The temperature is kept at 79° during the low activity sleep period. At 6:00 A.M., the temperature is lowered to 77° and then to 76° at 7:00 A.M. At 8:00 A.M., it is raised to 80° as the user leaves for work. The temperature stays at this value until 5:00 P.M. when it is set 77° and then lowered to 76° as the user arrives home from work. From 6:00 P.M. to 10:00 P.M., it is kept at 76°. At 10:00 P.M., it is raised to 77°, and then further raised to 79° at 11:00 P.M., as the sleep period begins.

FIG. 2B depicts a cooling case where the user is home during the day. As before, during the sleep period, the temperature is set at 79°. At 6:00 A.M., it is lowered to 77°, where it remains until 10:00 A.M. At 10.00 A.M., it is lowered to 76° until 1:00 P.M., when it is then lowered to 75° as the external temperature continues to increase towards the maximum for the day. As the external temperature begins to cool, the temperature is increased to 76° at 7:00 P.M., where it remains until 10:00 P.M. From 10:00 P.M. to 12:00 P.M., it is set at 77°. The temperature is set at 79° at 12:00 P.M., as the sleep period begins, and it remains there until 6:00 A.M.

FIG. 2C depicts a heating case where the user is not home during the day. The temperature is set for 66° during the sleep period. At 6:00 A.M., it is raised to 69°, where it remains until 8:00 A.M., as the user leaves for work, the temperature is lowered to 66°. From 8:00 A.M. until 5:00 P.M., it remains at 66°. At 5:00 P.M., the temperature is raised to 70° as the user returns home from work near 6:00 P.M. The temperature is left at 70° until 10:00 P.M. From 10:00 P.M. to 11:00 P.M., it is lowered to 69° and at 11:00 P.M., it is lowered to 66° as the sleep period begins.

FIG. 2D depicts a heating case where the user is home during the day. As in the above case, the temperature is set for 66° during the sleep period until 6:00 A.M. At this time, it is raised to 68°. At 7:00 A.M., it is raised again to 70°, where it remains until 11:00 A.M. At 11:00 A.M., it is lowered to 69° as the external temperature increases. At 6:00 P.M., as the external temperature begins to decrease, the temperature is raised to 70°, where it remains until 10:00 P.M. From 10:00 P.M. to 11:00 P.M., it is set back to 69°. At 11:00 P.M., the temperature is lowered to 66° as the sleep period begins.

OPERATION

Provision is made in the system 10 for the user to conveniently enter the values of reference temperatures corresponding to the various intervals of the day, making use of display 18. Ordinarily, display 18 shows the current values of time (including A.M. or P.M.), reference temperature and measured temperature. There are two methods of designating the particular one of the time intervals which is to have associated with it the reference temperature value being entered. According to the first method, a number designating the interval is set in data entry switches 14. One of the function switches 15 is activated, causing unit 11 to read the switches 14 as an interval designating number and to fetch for display the reference temperature stored in memory 13 for that interval. The reference temperature value corresponding to the displayed time interval can then be initially chosen or changed by entering a number on data entry switches 14 and activating a particular one of the function switches 15. Unit 11 then decodes switches 15, and determines therefrom that the number from switches 14 is to be entered as a reference temperature value. Unit 11 stores the number in the memory 13 location from which the value currently being displayed was taken.

According to the second method, activation of one of the function switches 15 initiates display of the values of time and reference temperature next in sequence from those currently being displayed. Then the data entry switches 14 can be used, as described above, to store a new reference temperature value in the place of the one displayed. Thus, beginning with the current time or an interval chosen by the first method, a new value can be entered for the reference temperature, and the function switch can then be activated to display the time and temperature for the next interval in sequence. Then, each succeeding reference temperature may be examined and changed, if desired, by stepping from one interval to the next through the sequence.

Data entry switches 14 are used to enter a number for the duration associated with each of the time intervals. One of the function switches 15 commands unit 11 to store the number in memory 13 as the value of the interval duration.

In order for the system 10 to keep time, an initial value is entered by means of the data entry switches 14 and function switches 15, and is stored by unit 11 in memory 13. Thereafter, circuits operating from a stable time base, such as the 60 Hz line frequency or a crystal controlled oscillator, provide periodic clock signals to unit 11. In response to the clock signals, unit 11 updates the value stored in the time location in memory 13. It is this updated time which is shown on display 18 as the current time, including an A.M.-P.M. indication.

The basic operation of system 10 is a cyclical process in which, during each interval of the day, the temperature measured by transducer 20 is repeatedly compared with a stored reference temperature to generate appropriate control signals for the cooling and heating systems. There can be considerable variety in the detailed steps, by which the objectives are achieved using a microprocessor. The following is one possible sequence of suitable steps.

Periodically, unit 11 reads an output register of analog-to-digital conversion unit 24 for the digital number representing the temperature measured by transducer 20. Shortly before or after doing this, unit 11 fetches from memory 13 the current updated value of time and a digital number representing the time at which the current control interval ends. These two numbers or times are compared to detect when the time passes out of one control interval and into the next. If the comparison shows that the present time is embraced by a new control interval, unit 11 adds the interval duration to the number corresponding to the end of the old interval, and the new end time is stored in memory 13. In addition, the reference temperature corresponding to the new interval would be retrieved from the sequence of reference temperatures in memory 13 and stored in a different location allocated as the reference temperature value currently used for control.

Precisely what happens next depends upon the mode of operation selected for system 10. This will be described in more detail below. The selection of the operating mode is made through activation of mode switches 16 by the user of system 10. Logic unit 11 reads the switch selection and stores a bit indicating the selected mode in memory 13. At those points in the control sequence when it is necessary to know the selected mode, logic unit 11 retrieves the stored bit from memory 13 and routes subsequent program steps accordingly.

Two parameters which are important to further processing are the hysteresis values, H, and the anticipator values, A. Each of these is entered by the user with data entry switches 14 and a function switch 15 corresponding to the particular parameter. Unit 11 stores the numbers from switches 14 in the memory 13 location allocated to A or H, as appropriate. Alternatively, the values can be programmed in read only memory 12.

In the process of making a control decision, unit 11 determines the selected operating mode and fetches from memory 13 applicable values of the current reference temperatures, hysteresis and anticipators. From the digital numbers corresponding to these quantities, unit 11 computes the value of a function which depends upon the selected operating mode. Unit 11 then retrieves the digital number corresponding to the present measured temperature from unit 13 and compares this to the functional value just computed. According to control rules described below, unit 11 derives from the results of this comparison a digital code to present to output circuit 26 to dictate relay openings and closings by circuit 26.

The preceding cycle of operations for producing control outputs based on a comparison of measured temperature with a function of a time varying reference temperature is repeated at an interval selected to produce effective temperature control, considering the thermal time constants involved. For example, the period of repetition for the above steps can be ten seconds or less.

The operations are also cyclical on a daily basis. The microprocessor is programmed such that when the present time increases beyond the end of the last control interval in the sequence, it is treated as being embraced by the first interval in the sequence. Thus, if there are 24 one-hour intervals, when the time exceeds the twenty-fourth hourly interval, it is considered to re-enter the first hourly interval.

OPERATING MODES

FIG. 3 illustrates operation of system 10 in four different operating modes. Each part of the FIGURE shows in a stylized way the variation with time of the measured temperature MT at transducer 20. All the variations shown are within the confines of a single time interval (e.g., an hour) in the sequence of control intervals. Those portions of the MT shown in solid line indicate periods in which heating or cooling is occurring. Where the graph is shown in dashed line, the temperature of the controlled space is drifting toward an unheated or uncooled state. In the various sections of FIG. 3, H is the value of hysteresis and A is the anticipator value. The parameter RT is the current value of the reference temperature. The quantities RTH and RTL are current values of a higher reference temperature and a lower reference temperature, respectively.

FIG. 3A illustrates system 10 operating in the Cooling mode. Initially, that is, when system 10 is first switched into this mode, if the measured temperature MT is greater than RT+A, system 10 initiates cooling, driving the measured temperature down. Any time the measured temperature decreases to the level of RT+A, system 10 generates a code to terminate cooling. The measured temperature continues to fall below RT+A, however, because there is a certain amount of residual coldness in system 28 after it is shut off. If the anticipator value A is well chosen, this residual coldness will drive the measured temperature down to the reference value RT before the residual cold is dissipated. As the cooling system 28 finally ceases cooling, the measured temperature value, near RT, begins to rise. Thereafter, whenever the temperature rises to the value RT+H, the cooling system 28 is turned on and remains on until the measured temperature decreases to RT+A.

Thus, selection of value of the hysteresis H determines the acceptable deviation in measured temperature from the time that the cooling system turns off until it is turned on again. The value of A is preferably selected just large enough so that residual cold in the cooling system will carry the measured temperature no further down than the reference temperature. Typical values of H are 1°–1.5° F. The value of A depends, of course, on the heating and cooling system used: typical values are 0.5°–0.8° F.

Each of the other operating modes of system 10 embodies concepts similar to those encountered in the Cooling mode. The Heating mode is shown in the FIG. 3B. Initially, the system 10 initiates heating when MT is less than RT-A. Thereafter, heating is begun whenever MT is less than or equal to RT-H. System 10 signals heating system 30 to cut off when MT is greater than or equal to RT-A. After the heating system 30 is turned off, residual heat in system 30 carries the measured temperature on up to the value of the referenced temperature RT. Once the residual heat is dissipated, MT begins to fall, continuing until heating is again turned on when MT reaches RT-H. The hysteresis and anticipator values entered for use in this mode can be different from those of the Cooling mode.

The Automatic mode, illustrated in FIGS. 3C and 3D, combines operations of the Cooling and Heating modes. In this mode, system 10 holds the measured temperature within a programmable temperature range. The upper end of the temperature range is a higher reference temperature value RTH; the lower end is a lower reference temperature value RTL. Thus, the Automatic Mode requires, for twenty-four time intervals, a total of forty-eight reference temperature values. In simpler versions of system 10, RTH is the same value of RT used for the Cooling mode, and RTL is the RT for the Heating mode. In more complicated versions, totally different sets of threshold values may be entered for each mode.

After the Automatic mode has been selected, the initial turn on of cooling occurs if the measured temperature is greater than RTH+A. Thereafter, as particularly illustrated in FIG. 3C, system 10 signals the cooling system 28 to turn off when MT becomes less than or equal to RTH+A, and it is turned back on if the measured temperature becomes greater than or equal to RTH+H. If conditions cause the measured temperature to enter the region between the high reference temperature value RTH and the lower reference temperature value RTL, system 10 commands neither heater nor cooling. If the measured temperature falls to the level of RTL-H, heating is initiated by system 10.

FIG. 3D illustrates that heating is initiated if the measured temperature is less than RTL-A upon selection of the Automatic mode. When the heating sufficiently raises the temperature that MT is greater than or equal to RTL-A, system 10 signals heating system 30 to turn off. Thereafter, whenever the measured temperature becomes less than or equal to RTL-H, the heat is signaled on. If the temperature should rise so that it is greater than or equal to RTH+H, the system changes over to cooling.

FIG. 3E illustrates an alternate embodiment of the Automatic mode, in which there is only one reference temperature value, RT, per time interval rather than a higher value RTH and a lower value RTL. This requires only twenty-four reference temperature values for twenty-four control intervals. The operation in FIG. 3E is like that in FIG. 3C, with RTH=RTL=RT.

The Manual Mode illustrated in FIG. 3F is like that of FIG. 3E, except that there is only one programmable reference temperature value, which is the same for all the control time intervals. The operation shown is like that of FIG. 3D, with RTH=RTL=RT, with the same value of RT all day, until reprogrammed.

System 10 allows a user to adjust the thermostat setting for an indefinite period in any operating mode without altering the stored profile of reference temperatures. At any time selected temperature adjustment values $\Delta T$, positive or negative, may be entered by means of the data entry switches 14 and a $\Delta T$ function switch 15. These adjustment values are stored by unit 11 in memory 13 locations allocated to $\Delta T$. A preferred method of utilizing $\Delta T$ is as follows. When the control functions such as RT+H are computed, the computation used would actually be (RT+$\Delta T$)+H. Thus, for so long as $\Delta T$ is not equal to zero, the current reference temperature is essentially modified by the amount of $\Delta T$. A typical situation in which this feature would be useful is where $\Delta T$ is given some non-zero value for a few hours to adjust the room temperature for comfort, then $\Delta T$ is reset to zero. In this case, it is only necessary to enter a value at the beginning of the adjustment period and regardless of the number of hours the adjustment is in effect. There is no requirement to remember the values of the reference temperature profile that is desired in the long run; these remain unchanged. The current value of $\Delta T$ is shown by display 18.

MULTI-STAGE OPERATION

Figure 4:
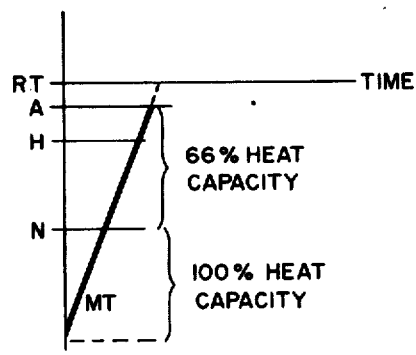
FIG. 4 is a graph showing the time variation of measured temperature in a system capable of multiple stage operation according to the invention.

System 10 provides for multiple stage operation of both heating and cooling systems. FIG. 4 depicts operation of the system in the Heating mode of operation; however, the basic operating principle described here is also applicable to other modes of operation. FIG. 4 depicts system 10 controlling a heating system designed to be operated at two levels of heat capacity, 66% and 100% of maximum. The operation of system 10 is the same as that previously described herein, for the Heating mode of operation, and particularly as shown in FIG. 3, except that the comparisons of current reference temperature value, RT and measured temperature value, MT include an additional parameter N. When MT is less than RT-N, where N is a programmable value, typically 2°, stored in the RAM 13 or ROM 12, unit 11 outputs a digital code to the output control circuit 26, that causes the heating system 30 to operate at full capacity. If MT is greater than RT-N, unit 11 causes the output control circuit 26 to output a control signal to cause the heating system 30 to operate at its lower heat capacity.

Figure 5:
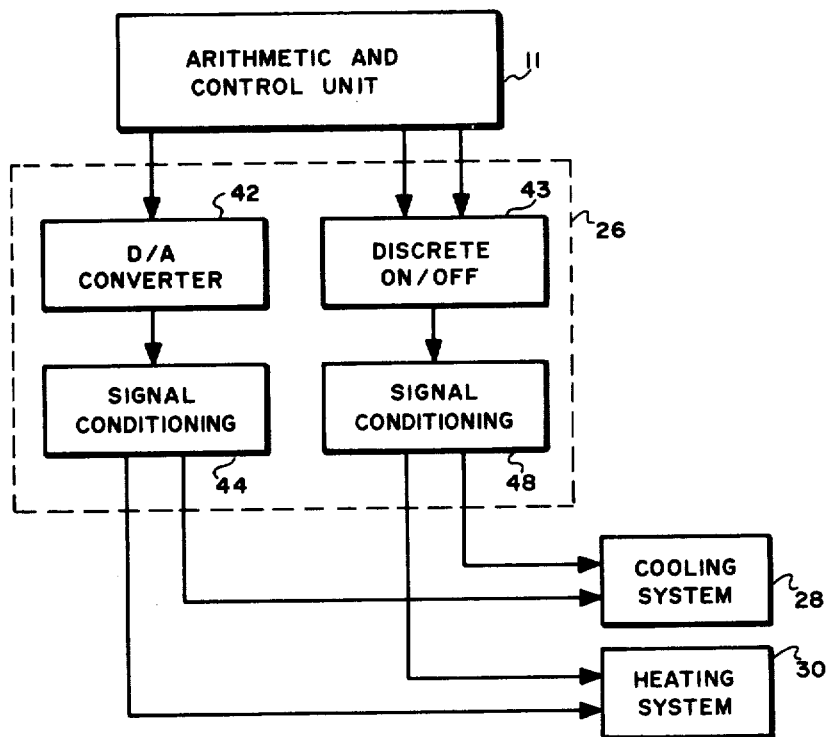
FIG. 5 is a partial block diagram of a system capable of multiple stage operation in accordance with the invention.

FIG. 5 depicts one configuration of the output circuit 26 of system 10 that can be utilized in a multi-stage application. There are circuits 43 having discrete outputs for use with on/off, switch type controls in systems 28 and 30. Digital-to-analog converters 42 provide a signal for proportional control elements in systems 28 and 30. Signal conditioners 44 and 48 typically have buffer amplifiers, line drivers, triacs and/or relays interfacing converters 42 and circuits 43 with the various types of controls used by systems 28 and 30.

The discrete circuits 43 respond to digital numbers and/or bits from unit 11 and furnish latched outputs. They consist of latches (flip flops) and other logic required to interface with the signal conditioners. For the two stage heating mode depicted in FIG. 4, two discrete outputs interfaced with a two stage heating system, having discrete type controls, will cause the system to operate at either 66% or 100% of its maximum capacity.

The digital-to-analog converters 42 respond to digital numbers from unit 11, latch the data at the input and provide a steady state analog output, proportional to the value of the current digital input. For the heating mode depicted in FIG. 4, two analog levels when interfaced with a two stage heating system, having analog type variable controls will cause the system to operate at either 66% or 100% of its maximum capacity.

Additional levels of control for systems having more levels of heating and cooling capacity are provided by assigning more values of N, determining the magnitude of the output levels, storing this data in the ROM 12 or RAM 13, performing additional comparisons, as discussed above and outputting data to control circuit 26, to cause it to issue the necessary outputs.

Additionally, the analog outputs of output circuit 26 when applied to variable controls such as variable flow rate valves can be related in unit 11 to the difference between the measured temperature and the current reference temperature, thus providing proportional control. Alternatively, more complex linear or nonlinear control functions of the measured temperature and the current reference temperature can be implemented with the configuration illustrated in FIG. 5.

ZONE CONTROL

Figure 6:
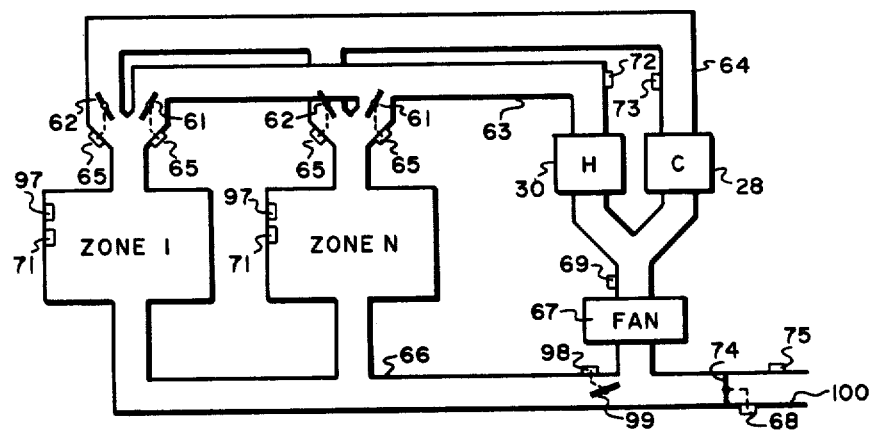
FIG. 6 is a schematic diagram of a multiple zone temperature control system embodying the invention.
Figure 7:
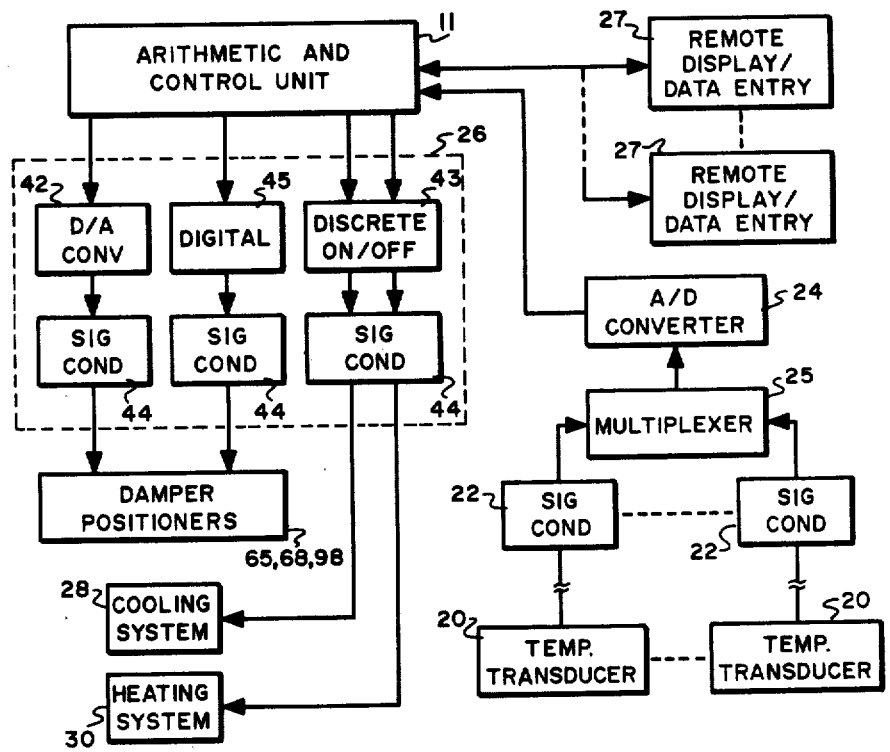
FIG. 7 is a partial block diagram of a system for performing multiple zone temperature control in accordance with the invention.

FIGS. 6 and 7 illustrate the use of system 10 with the remote input and output of data in the control and regulation of temperature in different areas or zones. In this application, system 10 enables the temperature in each area to vary independently, according to a programmed sequence of reference temperatures, as discussed previously. Additionally, the zone requiring the most heating or cooling determines the operating capacity level of the heating and cooling systems as described with respect to multi-staging systems.

FIG. 6 shows one method that provides zone temperature control and regulation. The zones are depicted as separate areas; however, each zone can be either separate or combined with other zones. Each zone is supplied with a hot deck 63 and a cold deck 64 having variable position dampers 61 and 62, respectively. Reversible positioning devices 65 are mechanically attached to dampers 61 and 62, thereby causing them to reversibly open or close in response to control signals from system 10.

The temperature in each area is therefore determined by the temperatures of the hot and cold decks 63 and 64 and by the positions of the dampers 61 and 62 which mix the air exiting the hot and cold decks, in the correct proportion. The position of dampers 61 and 62 are determined by system 10 from temperature transducer 97, remotely located from system 10, in each zone. Circulation in the zones is provided by the fan 67 forcing air through the heating and cooling systems 30 and 28, through the hot and cold decks 63 and 64, dampers 61 and 62, and back through the return air duct 66, and damper 99 to the fan.

Temperature transducers 72 and 73 in the hot and cold decks 63 and 64 are used by system 10 to adjust the operating capacity levels of the systems 30 and 28, to ensure adequate hot and cold deck temperatures, and to monitor system operation and detect system malfunction. Temperature transducers 69 and 75 in the return and external air ducts 66 and 100 are used by system 10 to reversibly control damper positioners 98 and 68 which operate dampers 99 and 74 in the return air duct and external air duct to input fresh air into the zones.

A display and control panel 71 in each zone, or at a control point, remotely located from system 10 provides for display and entry of time intervals, time of day, temperature, etc.

FIG. 7 shows the configuration of the data input/output section of system 10 for this application. The display/data entry panels 27 located in the zones or at a remotely located control point enable the time intervals and corresponding reference temperatures for each zone to be entered into the RAM 13 via unit 11. These values can be the same for all zones or they can be unique to each zone. If they are unique for one or more zones, system 10 stores them in the RAM 13 which is partitioned, or the data is otherwise identified, such that it can always be related to the particular zone to which it corresponds. The data transfer to and from the remote display/data entry panels is accomplished via an extension of the system 10 control and data bus to each zone, to provide for either a parallel or serial data flow on either a preprogrammed, priority or sequential basis.

The outputs of the temperature transducers 20, located in the zones, in the return air duct and in the external environment is fed to the signal conditioners 22. The signal conditioners buffer and scale the signals to the proper value and feed them to the multiplexer 25. Under control of unit 11, the signal is fed through the multiplexer 25 to the analog-to-digital converter 24, where it is converted to a digital number. The measured temperature for each zone is determined in a like manner by unit 11, on a preprogrammed, priority or sequential basis. Each temperature value is then compared to the control function as determined from the correct reference temperature, hysteresis and anticipator values, for each zone as previously described and particularly as shown in FIGS. 3 and 4.

Additionally, the external temperature measurement can be utilized by system 10 in the computation of the control functions and a positive or negative external temperature adjustment $X\Delta T$ can be made to the current reference temperature value. For example, in using the control function RT+H, the actual computation would be $(RT+X \Delta T) + H$. One approach to computing a value for $X\Delta T$ is to multiply the differences between the external temperature and the current reference temperature by a positive or negative factor, the value of which has been programmed into system 10 by means of the data entry and functions switches 14 and 15. Another approach is to provide for a set of $X\Delta T$ values to be entered via switches 14 and 15, each value of $X\Delta T$ to be used in a particular range of the external temperature.

The availability of programmable reference temperatures for twenty-four, one-hour intervals will be satisfactory for many applications of system 10. In those cases where it is desired to vary the reference temperature more smoothly, it is not absolutely necessary to provide more programmable reference temperature values. The microprocessor can be programmed to use the stored reference temperature values at the ends of the time intervals, but to calculate a reference temperature value within the interval, by interpolation.

System 10 is interfaced to the heating and cooling systems 28 and 30, damper positioners 5, etc., through the output control circuit 26. It contains discrete on/off type circuits 43, digital type circuits 45, digital-to-analog converters 42 and signal conditioners 44. The discrete circuits 43 respond to digital numbers and/or bits from unit 11 and provide latched and/or unlatched outputs. The digital type circuits 45 respond to digital inputs from unit 11 and provide parallel and/or serial type outputs. The digital-to-analog converters 42 respond to digital inputs from unit 11, latch the data at the input and provide a steady state analog output proportional to the value of the current digital input. The signal conditioners 44 consist of buffer amplifiers, line drivers, triacs and/or relays as may be required to interface system 10 to the various types of damper positioners and controls used by systems 30 and 28.

In each of the above embodiments, it is preferable that output circuit 26 include means for ensuring that the output remains in one state for a selected minimum time before being switched to another state. This prevents system 28 or 30 from being switched off, then immediately back on, for example.

Figure 8:
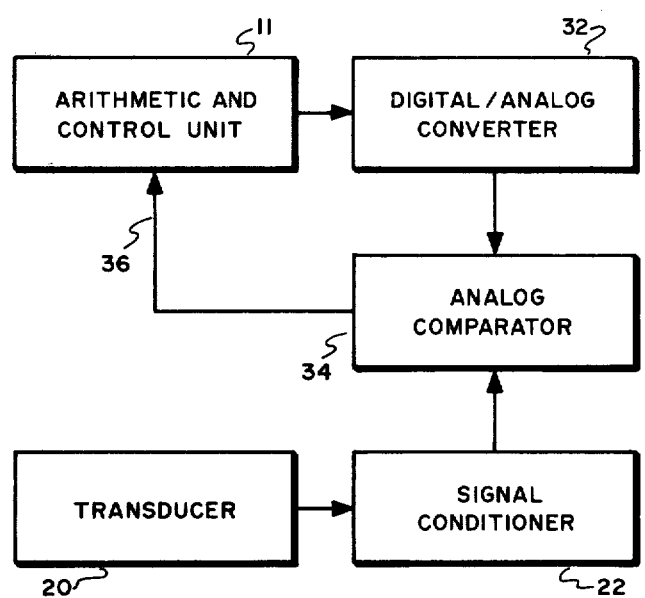
FIG. 8 is a block diagram of alternate means for digitizing a measured temperature signal.

FIG. 8 illustrates one of several possible alternate means for converting the temperature measured by transducer 20 from an analog form to a digital number. Unit 11 outputs a series of digital numbers to the digital-to-analog converter 32 such that a successive approximation type conversion can be made. The converter produces an analog output proportional to the value of each digital input. The analog output, for each digital input, is then compared in the analog comparator 34 to the analog input from the temperature transducer 20, via the signal conditioner 22. Thus, a comparison is made for each successive digital output from unit 11. This process continues, until comparator 34 senses that the analog values are equal or within the range of one least significant bit. When this occurs, comparator 34 sends a signal 36 to unit 11 to stop the process. The last digital output from unit 11 thus represents the analog value of the measured temperature from transducer 20.

The capability for obtaining remote input/output with system 10 allows it to carry on important performance monitoring functions. For example, system 10 can detect when systems 28 or 30 fail in their heating or cooling functions. When unit 11 issues a turn on signal for one of the systems 28 or 30, it can store in memory 13 a record of the current temperature and time. Subsequently, when it brings in new digital values of the measured temperature, it can make the determination as to whether the heating or cooling system has changed the measured temperature appropriately, considering the time elapsed since turn on. If the measured temperature has failed to respond properly, then system 10 can sound an alarm 40 and/or show a malfunction indication on display 18. Similarly, discrete on/off type temperature sensitive switches located in various elements of the heating and cooling systems can be used by system 10 to detect malfunctions or unsafe conditions. These conditions can also be detected from temperatures measured by analog transducers and compared in unit 11 to stored limit values.

System 10 is normally operated by the electrical power system used for cooling and heating systems 28 and 30. However, means are provided for automatically switching system 10 to battery operation when the electrical power system fails. In a preferred embodiment, system 10 includes means for maintaining the battery charged from the electrical power system, when it is operative. The battery backup operation is necessary to prevent system 10 from losing time of day or reference temperature values that may be stored in volatile memory, during power outages.

The exhibition of a number of the variables by display 18 have been described above. These and others that are usefully displayed indicated in FIG. 1. They include the measured temperature, an indication of whether heating or cooling is presently commanded, the number entered on switches 14, the present time of day, the current reference temperature (including higher and lower values), temperature adjustments ($\Delta T$ and $X\Delta T$), the heating/cooling malfunction indication, and the duration of the control intervals (typically one hour).

IMPROVED SYSTEM AND METHOD

A number of additions and modifications are possible for the described preferred embodiments. Several of the possible improvements which may be made are described below.

As pointed out above, one use of system 10 is to provide temperature control for a person who is away from home at work during the day. For such a person, the daily profile of reference temperatures desired for a work day is different from the profile desired for a day off work. Accordingly, it is important to provide for at least one additional set of reference temperature values to be used on days off. The day off reference values are stored in random access memory 13 just as the work day values are.

Where system 10 is to use two different sets of reference temperatures for different days, it can be manually switched to the alternate set, or arithmetic and control unit 11 can note what day it is, as it is keeping track of the time hour by hour. Then, at the beginning of each new day, the control program for the system checks on which set of reference values are to be used that day and provides that the reference temperature values used are taken from the appropriate memory locations.

An additional set of locations in memory 13 contain a code for each day, indicating which set of reference values are to be used on that day. For the typical user, it is satisfactory to provide seven memory locations, each corresponding to a day of the week, with control unit 11 automatically cycling through the seven locations each week. The codes for each day of the week are entered by using function switches 15 and data entry switches 14.

For users with more complicated schedules, more memory locations can be provided, one for each day over a period of several weeks or a month.

It will often be desirable to delay the onset of a new reference temperature. For example if one is staying up an hour longer than usual at night, it is convenient to delay the onset of a programmed sleeping period reference temperature for an hour. One way this is accomplished is with a delay value that can be entered, specifying that the current reference temperature is to be held for the entered period. In this embodiment, the program sequence of system 10 includes steps which check to see if a delay has been entered and whether the entered delay period has expired. Only when the delay period has expired is the system free to release the old reference temperature and use the one ordinarily appropriate to the current time.

Another way of delaying the onset of a new reference temperature is to switch the system 10 into the Manual Mode until it is desired for the new reference temperature to become effective. As described hereinabove, system 10 is designed so that there is a reference temperature value specifically for the Manual Mode. A possible variation in design is to have the Manual Mode use as its reference temperature, the reference temperature value in effect when the system is switched into Manual Mode. This is, of course, quite useful in manually delaying the onset of a new reference temperature.

In an alternate embodiment of the data entry previously described, system 10 provides for the automatic entry of reference temperature values for consecutive time periods in those cases where the values are the same. First, the selected reference temperature value is entered for the first time period for which it is to be used. Then, the user continues to actuate a switch which causes system 10 to enter this first value for succeeding time periods, until the time period is reached, for which a different reference temperature value is to be entered. In this manner, data entry is simplified, since it is not necessary to enter reference temperature values for every time period, unless each value is different from the previous one.

Under the constraints of current technology, system 10 is preferably powered from the AC line in a building, and can run only a short time from a small battery. In one embodiment, system 10 responds to an interruption of the AC power by shutting itself down except for random access memory 13, control unit 11 and other portions of the system required to keep accurate time. Those portions not shut down are powered by a battery. At the end of the AC power outage, system 10 is programmed to test its battery voltage with a comparator circuit or using analog-to-digital converter 24. If the battery voltage is above a predetermined level, it is supposed that the battery has adequately supplied power to the portions of the system it supported during the AC outage. In this case, system 10 continues its operation as though not interrupted. If the battery voltage is too low, stored values of reference temperatures and time may be incorrect. In the latter case, system 10 adopts preselected nominal values of reference temperatures and gives an indication for the user to reset time and reference temperature values.

One other test the system 10 makes to determine whether or not reference temperature values stored in the random access memory 13 has changed, is to perform an addition of the reference values when they are initially stored or changed by the user. The sum of these values is then stored in the random access memory 13.

Thereafter, on a periodic basis and particularly after every power outage, system 10 immediately performs an addition of the values again and compares this sum with the value of the previously computed sum stored in the random access memory 13. If they compare, system 10 continues normal operation. If they do not compare, system 10 adopts preselected nominal values and gives an indication for the user to reset the reference temperature values.

In an improved embodiment of the control program for system 10, there is an additional check point before issuing a command to output circuit 26. Each time a command is given to turn off cooling system 28 or heating system 30, the program begins to keep track of the time elapsed after the turn off command. Then, before it issues a turn on command to the same system 28 or 30, it checks to determine that a preselected time has elapsed since the turn off command. This prevents turning on one of the systems 28 or 30 too soon after it has been turned off, and is particularly important with respect to air conditioning units.

System 10 has a capability considerably expanded beyond conventional systems for monitoring its own operational variables. As mentioned above, it can by use of its temperature sensors and other remote transducers, detect unsafe or undesirable temperature conditions or some overall malfunction. In addition, other variables, such as the overall current drawn by the system can be monitored to produce alarms or modify the response of the system accordingly.

Although preferred embodiments of the invention have been described in detail, it is to be understood that various changes, substitutions, and alterations can be made therein without departing from the spirit and scope of the invention as defined by the appended claims.

What is claimed is:

1. A system for controlling a measured temperature during a sequence of time intervals in accordance with a sequence of selected reference temperatures, each corresponding to one of the intervals, comprising:
    means for storing a plurality of digital numbers, each representing a value of one of the reference temperatures;
    means connectable to respond to a reference frequency source for repeatedly generating a digital number representative, at each generation, of the present time of day;
    means for storing a digital number representative of a value of hysteresis;
    updating means for repeatedly determining, from said time of day number, when one of said intervals embraces the present time and identifying the one of said reference temperatures corresponding to said embracing interval and for storing, as a current reference temperature value, a digital number representing the value of said identified reference temperature, said updating means including means for determining that as soon as said present time exceeds the last interval in said sequence, said time becomes embraced by the first interval in the sequence;
    means for displaying selected ones of said digital numbers;
    means connectable to be responsive to a sensor of said measured temperature for generating an electrical signal representation of said measured temperatures; and
    comparison means responsive to said signal representation, to the current reference temperature number, and to the hysteresis number, for repeatedly generating control signals suitable for controlling thermal means affecting said measured temperature.

2. The system of claim 1, further including means for storing a digital number representative of an anticipator value.

3. The system of claim 2, wherein said comparison means includes:
    means for generating a signal capable of initiating heating, when the measured temperature is less than the current reference temperature value minus the hysteresis value and
    means for generating a signal capable of terminating heating, when the measured temperature becomes substantially equal to the current reference temperature value minus the anticipator value.

4. The system of claim 2, wherein said comparison means includes:
    means for generating a signal capable of initiating cooling, when the measured temperature is greater than the current reference temperature value plus the hysteresis value and
    means for generating a signal capable of terminating cooling, when the measured temperature becomes substantially equal to the current reference temperature value plus the anticipator value.

5. The system of claim 2, wherein said comparison means includes:
    means for generating a signal capable of initiating heating, when the measured temperature is less than the current reference temperature value minus the hysteresis value and
    means for generating a signal capable of terminating heating, when the measured temperature increases to the current reference temperature value minus the anticipator value;
    means for generating a signal capable of initiating cooling, when the measured temperature is greater than the current reference temperature value plus the hysteresis value; and
    means for generating a signal capable of terminating cooling, when the measured temperature decreases to the current reference temperature value plus the anticipator value.

6. The system of claim 2
    wherein said reference temperatures, including said current reference temperature, are relatively higher reference temperatures;
    further including means, accessible to a user, for entering and storing a sequence of digital numbers, each representing a value of a relatively lower reference temperature and each corresponding to one of said intervals;
    wherein said updating means further includes means for identifying the one of the lower reference temperatures corresponding to said embracing interval and for storing, as a current lower reference temperature value, a digital number representing the value of said identified lower reference temperature; and
    wherein said comparison means includes:
        means for generating a signal capable of initiating heating, when the measured temperature is less than the current lower reference temperature value minus the hysteresis value and means for generating a signal capable of terminating heating, when the measured temperature increases to the current lower reference temperature value minus the anticipator value;

means for generating a signal capable of initiating cooling, when the measured temperature is greater than the current higher reference temperature value plus the hysteresis value, and means for generating a signal capable of terminating cooling, when the measured temperature decreases to the current higher reference temperature value plus the anticipator value.

7. The system of claim 1, further including
means for storing a digital number representing an acceptable limit of a variable number associated with the operation of the system; and
means, responsive to the limit number and to said variable number, for generating an alarm indication of the limit of acceptable operation is exceeded.

8. The system of claim 1, further including:
means for storing a plurality of digital numbers, each representing a value of one reference temperature in a second sequence of reference temperatures; and
means for storing a digital number indicative of a day selected for use of said second sequence; and
means responsive to the time of day number and to the selected day number, for detecting the occurrence of the selected day and using said second sequence in place of the first-mentioned sequence of reference temperatures on said day.

9. The system of claim 1, further comprising means for generating additional reference temperature values for use in said intervals, interspersed between the use of the first-mentioned reference temperature values, including means responsive to said time of day number to generate said additional reference temperature values by interpolation from the profile of said first-mentioned reference temperature values.

10. The system of claim 1, further including means for preventing the generation of a control signal activating said thermal means for a predetermined time after the generation of a control signal deactivating said thermal means.

11. The system of claim 1, further including:
a main power source,
an auxiliary power source,
means for switching at least a portion of said system to be powered from said auxiliary source during the period from any failure of said main power source to the reestablishment thereof; and
means for testing the auxiliary source after reestablishment of the main source, to determine whether said portion of the system was adequately powered during said period.

12. The system of claim 11 further including means, responsive to the condition that said portion of the system was not adequately powered during said period, for adopting preselected nominal values for use in place of said digital numbers representing said reference temperatures.

13. The system of claim 1, further including means for computing the sum of said stored numbers representing the reference temperature values in said sequence at a first time and storing the sum, then recomputing said sum at a second time and comparing the stored and recomputed sums to determine whether the stored reference temperature numbers have changed between said first and second times.

14. The system of claim 13 further including means, responsive to a change in said stored reference temperature numbers between said first and second times, for adopting preselected nominal values for use in place of said stored reference temperature numbers.

15. The system of claim 1, wherein said updating means further includes
means for switching to a manual mode of operation in which said current reference temperature value has a manual mode value which is not changed by the updating means when the time of day changes to a new time interval; and
means for assigning as said manual mode value the last current reference temperature value before switching to the manual mode.

16. The system of claim 1, further including
means for entering and storing a chosen one of said reference temperature numbers corresponding to a selected one of the time intervals; and
means for stepping through a selected subsequence of said time intervals following the selected one interval to store said chosen number as a reference temperature value for each of the intervals in the subsequence.

17. The system of claim 1 further including means for entering a delay value representing a delay time period and means for preventing said updating means from storing, as a current reference temperature value, said digital number representing the value of the identified reference temperature until said delay time period has expired, whereby the reference temperature stored at the beginning of the delay time period is held during said period.

18. A system for controlling a measured temperature in each of a plurality of zones, during a sequence of time intervals, comprising:
means for storing values, for each zone, of a sequence of reference temperatures, each corresponding to one of the time intervals;
means for selecting from the reference temperature values, for each zone, and during each interval, a current reference temperature value;
means located in each one of said zones for entering information for use by the system;
means located in each of said zones for displaying information from said system;
means for generating signals suitable for controlling means affecting the temperature of air delivered to the collection of zones, dependent on the relation of the measured temperatures in the zones to the current reference temperatures of the zones; and
means for generating signals suitable for controlling means affecting the temperature of air delivered to each zone, dependent on the relation of measured temperature in the affected zone to the current reference temperature thereof.

19. A system for controlling a measured temperature during a sequence of time intervals in accordance with a sequence of selected reference temperatures, each corresponding to one of the intervals, comprising;
means for storing a plurality of digital numbers, each representing a value of one of the reference temperatures;
means connectable to respond to a reference frequency source for repeatedly generating a digital number representative, at each generation, of the present time of day;

updating means for repeatedly determining, from said time of day number, when one of said intervals embraces the present time and identifying the one of said reference temperatures corresponding to said embracing interval and for storing, as a current reference temperature value, a digital number representing the value of said identified reference temperature, said updating means including means for determining that as soon as said present time exceeds the last interval in said sequence, said time becomes embraced by the first interval in the sequence;

means for displaying selected ones of said digital numbers;

means connectable to be responsive to a sensor of said measured temperature for generating an electrical signal representation of said measured temperatures; and comparison means responsive to said signal representation and to the current reference temperature number for repeatedly generating control signals suitable for controlling thermal means affecting said measured temperature.

20. The system of claim 19 further including means for providing a value of hysteresis.

21. The system of claim 20 wherein said means for providing a value of hysteresis includes means for storing a number representative of said value of hysteresis.

22. A system for controlling a measured temperature during a sequence of time intervals in accordance with a sequence of selected reference temperatures, each corresponding to one of the intervals, comprising:

means for storing a plurality of values each representing one of the reference temperatures;

means connectable to respond to a reference frequency source for repeatedly generating a number representative at each generation, of the present time of day;

updating means for repeatedly determining, from said time of day number, when one of said intervals embraces the present time and identifying the one of said reference temperatures corresponding to said embracing interval and for using, as a current reference temperature value, the value of said identified reference temperature, said updating means including means for determining that as soon as said present time exceeds the last interval in said sequence, said time becomes embraced by the first interval in the sequence;

means connectable to be responsive to a sensor of said measured temperature for generating an electrical signal representation of said measured temperature; and comparison means responsive to said signal representation and to the current reference temperature value for repeatedly generating control signals suitable for controlling thermal means affecting said measured temperature.

23. The system of claim 22 further including means for providing a hysteresis value and an anticipator value, wherein said comparison means is also responsive to said hysteresis value and said anticipator value.

24. The system of claim 22, further including means, accessible to a user, for entering the reference temperature values.

25. The system of claim 22, further including means, accessible to a user, for selecting a time of day and for displaying the value of the reference temperature corresponding to the interval embracing the selected time and means, accessible to a user, for entering a selected reference temperature value replacing the displayed value.

26. The system of claim 22, further including means for displaying selected ones of said reference temperature values and time of day numbers.

27. The system of claim 22, further including means for providing a value representative of hysteresis.

28. The system of claim 27, further including means for storing a value representative of an anticipator value; and wherein said comparison means includes means for generating said control signals capable of activating said thermal means, dependent on the relation of the measured temperature to the current reference temperature value as modified by the hysteresis value; and means for generating said control signals, capable of deactivating said thermal means, dependent on the relation of the measured temperature to the current reference temperature value as modified by the anticipator value.

29. The system of claim 22, including means for storing a digital number representative of the value of a parameter for multiple stage operation;

wherein the comparison means includes means for generating said control signals capable of commanding said thermal means to affect the measured temperature at a rate dependent on a comparison between said parameter value and the deviation of the measured temperature from the current reference temperature value.

30. The system of claim 22, further including:

means for using a plurality of values, each representing a value of one reference temperature in a second sequence of reference temperatures; and means for deriving a signal indicative of a day selected for use of said second sequence; and means for detecting the occurrence of the selected day and using said second sequence in place of the first-mentioned sequence of reference temperatures on said day.

31. The system of claim 22, wherein said signal representation is an electrical analog signal; and said comparison means further includes means for converting said signal to a sequence of digital representations.

32. The system of claim 22, further including:

means for preventing the generation of a control signal activating said thermal means for a predetermined time after the generation of a control signal deactivating said thermal means.

33. The system of claim 22, further including:

a main power source;

an auxiliary power source; and means for switching at least a portion of said system to be powered from said auxiliary source during the period from any failure of said main power source to the reestablishment thereof.

34. The system of claim 33, further including:

means for testing the auxiliary source to determine whether said portion of the system was adequately powered during said period; and means responsive to the condition that said portion of the system was not adequately powered during said period for adopting preselected nominal values for use in place of said reference temperature values.

35. The system of claim 22, further including:

means for computing the sum of said stored values representing the reference temperature values in said sequence at a first time and storing the sum and recomputing said sum at a second time and comparing the stored and recomputed sums to determine whether the stored reference temperature values have changed between said first and second times; and means responsive to a change in said stored reference temperature values between said first and second times for adopting preselected nominal values for use in place of said stored reference temperature values.

36. The system of claim 22, wherein said updating means further includes:

means for switching to a reference temperature value which is not changed by the updating means when the time of day changes to a new time interval.

37. The system of claim 22, further including:

means for entering a delay value representing a delay time period and means for preventing said updating means from storing, as a current reference temperature value, said value of the identified reference temperature until said delay time has expired, whereby the reference temperature stored at the beginning of the delay time period is held during said period.

* * * * *